US011979949B2

(12) United States Patent
Krietzman

(10) Patent No.: US 11,979,949 B2
(45) Date of Patent: May 7, 2024

(54) PORTABLE MULTIZONE INDUCATION VAPORIZER FOR TOBACCO CONSUMABLES

(71) Applicant: Mark H. Krietzman, Palos Verdes Estates, CA (US)

(72) Inventor: Mark H. Krietzman, Palos Verdes Estates, CA (US)

( * ) Notice: Subject to any disclaimer, the term of this patent is extended or adjusted under 35 U.S.C. 154(b) by 0 days.

(21) Appl. No.: 18/133,991

(22) Filed: Apr. 12, 2023

(65) Prior Publication Data

US 2023/0254945 A1 Aug. 10, 2023

Related U.S. Application Data

(63) Continuation-in-part of application No. 17/147,030, filed on Jan. 12, 2021, now Pat. No. 11,770,877, which is a continuation of application No. 16/410,858, filed on May 13, 2019, now Pat. No. 10,893,707, which is a continuation of application (Continued)

(51) Int. Cl.

| | |
|---|---|
| ***H05B 1/02*** | (2006.01) |
| ***A24B 15/16*** | (2020.01) |
| ***A24F 40/46*** | (2020.01) |
| ***A24F 40/50*** | (2020.01) |
| ***H05B 3/14*** | (2006.01) |
| ***H05B 3/42*** | (2006.01) |
| *A24F 40/60* | (2020.01) |

(52) U.S. Cl.

CPC ........... *H05B 1/0244* (2013.01); *A24B 15/16* (2013.01); *A24F 40/46* (2020.01); *A24F 40/50* (2020.01); *H05B 1/0225* (2013.01); *H05B 3/146* (2013.01); *H05B 3/42* (2013.01); *A24F 40/60* (2020.01); *H05B 2203/014* (2013.01); *H05B 2203/021* (2013.01); *H05B 2203/022* (2013.01)

(58) Field of Classification Search

None

See application file for complete search history.

(56) References Cited

U.S. PATENT DOCUMENTS 4,947,874 A 8/1990 Brooks et al.
4,947,875 A 8/1990 Brooks et al.
(Continued)

FOREIGN PATENT DOCUMENTS

CN 1541577 11/2004
CN 101518361 9/2009
(Continued)

OTHER PUBLICATIONS

U.S. Appl. No. 14/142,528, Jul. 2015, Lyubomirskiy et al.

*Primary Examiner* — Ross N Gushi

(74) *Attorney, Agent, or Firm* — Mark H. Krietzman

(57) ABSTRACT

Efficient Heating of a consumable containing tobacco (or other plant material) without combustion using multiple induction heating zones for smoke free release of pant resins for use with tobacco or *cannabis*, including utilizing a removable cartridge which may contain metal foil regions. The cartridge is placed removably into a guide wherein heating occurs in zones via conductive and/or inductive heating elements. Such heat being at a sufficient temperature to vaporize resins or oils on plant material such as hemp, tobacco and *cannabis*, for inhalation from the cartridge.

17 Claims, 9 Drawing Sheets

Related U.S. Application Data

No. 15/898,629, filed on Feb. 18, 2018, now Pat. No. 10,299,515, which is a continuation-in-part of application No. 15/045,442, filed on Feb. 17, 2016, now Pat. No. 9,894,936, application No. 18/133,991 is a continuation of application No. 17/211,721, filed on Mar. 24, 2021, now Pat. No. 11,647,566, which is a continuation of application No. 16/118,244, filed on Aug. 30, 2018, now Pat. No. 10,986,872, which is a continuation of application No. 15/045,410, filed on Feb. 17, 2016, now Pat. No. 10,076,137.

(60) Provisional application No. 62/116,926, filed on Feb. 17, 2015, provisional application No. 62/127,817, filed on Mar. 3, 2015, provisional application No. 62/184,396, filed on Jun. 25, 2015, provisional application No. 62/208,786, filed on Aug. 23, 2015, provisional application No. 62/270,557, filed on Dec. 21, 2015.

(56) References Cited

U.S. PATENT DOCUMENTS

| | | | | |
|---|---|---|---|---|
| 5,144,962 | A | 9/1992 | Counts et al. | |
| 5,269,327 | A | 12/1993 | Counts et al. | |
| 5,388,594 | A | 2/1995 | Counts et al. | |
| 5,530,225 | A | 6/1996 | Hajaligol | |
| 5,613,505 | A * | 3/1997 | Campbell | H05B 6/365 131/194 |
| 5,649,554 | A | 7/1997 | Sprinkel et al. | |
| 5,692,525 | A | 12/1997 | Counts et al. | |
| 5,708,258 | A | 1/1998 | Counts et al. | |
| 5,954,979 | A | 9/1999 | Counts et al. | |
| 6,155,268 | A | 12/2000 | Takeuchi | |
| 6,516,796 | B1 | 2/2003 | Cox et al. | |
| 6,615,840 | B1 | 9/2003 | Fournier et al. | |
| 7,185,659 | B2 | 3/2007 | Sharpe | |
| 9,032,968 | B2 | 5/2015 | Glasberg et al. | |
| 9,084,440 | B2 | 7/2015 | Zuber et al. | |
| 9,259,035 | B2 | 2/2016 | Terry et al. | |
| 9,271,526 | B2 | 3/2016 | Liu | |
| 9,414,629 | B2 | 8/2016 | Egoyants et al. | |
| 9,451,791 | B2 | 9/2016 | Sears | |
| 9,510,623 | B2 | 12/2016 | Tucker et al. | |
| 9,516,899 | B2 | 12/2016 | Plojoux et al. | |
| 9,532,603 | B2 | 1/2017 | Plojoux et al. | |
| 9,609,894 | B2 | 4/2017 | Abramov et al. | |
| 9,675,117 | B2 | 6/2017 | Li et al. | |
| 9,775,380 | B2 | 10/2017 | Fernando et al. | |
| 9,826,780 | B2 | 11/2017 | Krietzman | |
| 9,854,841 | B2 | 1/2018 | Ampolini et al. | |
| 10,021,912 | B2 | 7/2018 | Yamada et al. | |
| 10,058,122 | B2 | 8/2018 | Steingraber et al. | |
| 10,076,137 | B2 | 9/2018 | Krietzman | |
| 10,130,780 | B2 | 11/2018 | Talon | |
| 10,238,764 | B2 | 3/2019 | Trzecieski | |
| 10,299,515 | B2 | 5/2019 | Krietzman | |
| 10,785,198 | B2 | 9/2020 | Pahl et al. | |
| 10,885,734 | B2 | 1/2021 | Schoenfelder et al. | |
| 10,982,899 | B1 | 4/2021 | Gelardi | |
| 11,007,546 | B2 | 5/2021 | Hohmann et al. | |
| 11,033,056 | B2 | 6/2021 | Gill et al. | |
| 11,039,644 | B2 * | 6/2021 | Paprocki | A24F 40/46 |
| 11,134,717 | B2 | 10/2021 | Naughton et al. | |
| 11,457,667 | B2 | 10/2022 | Krietzman | |
| 2002/0179179 | A1 | 12/2002 | Volpenheim et al. | |
| 2004/0089314 | A1 | 5/2004 | Felter et al. | |
| 2007/0074734 | A1 | 4/2007 | Braunshteyn et al. | |
| 2013/0218066 | A1 | 8/2013 | Duquet et al. | |
| 2014/0014124 | A1 | 1/2014 | Glasberg et al. | |
| 2014/0097207 | A1 | 4/2014 | Szymiczek et al. | |
| 2014/0202476 | A1 | 7/2014 | Egoyants et al. | |
| 2014/0366898 | A1 | 12/2014 | Monsees et al. | |
| 2015/0040929 | A1 | 2/2015 | Hon | |
| 2015/0150308 | A1 | 6/2015 | Monsees et al. | |
| 2015/0284177 | A1 | 10/2015 | Patil et al. | |
| 2015/0305406 | A1 | 10/2015 | Li et al. | |
| 2015/0306617 | A1 | 10/2015 | Olegnowicz | |
| 2015/0342257 | A1 | 12/2015 | Chen | |
| 2016/0198771 | A1 | 7/2016 | Goggin et al. | |
| 2016/0235124 | A1 | 8/2016 | Krietzman | |
| 2016/0255879 | A1 | 9/2016 | Paprocki et al. | |
| 2016/0278436 | A1 | 9/2016 | Verleur et al. | |
| 2016/0331033 | A1 | 11/2016 | Hopps et al. | |
| 2017/0108210 | A1 | 4/2017 | Meinhart et al. | |
| 2017/0119051 | A1 | 5/2017 | Blandino et al. | |
| 2017/0156407 | A1 | 6/2017 | Abramov et al. | |
| 2017/0215478 | A1 | 8/2017 | Harrison et al. | |
| 2017/0360092 | A1 | 12/2017 | Althorpe et al. | |
| 2018/0030974 | A1 | 2/2018 | Cosgarea | |
| 2018/0085551 | A1 | 3/2018 | Krietzman | |
| 2018/0140001 | A1 | 5/2018 | Gabbay | |
| 2019/0195852 | A1 | 6/2019 | Bryant, Jr. et al. | |
| 2019/0373679 | A1 | 12/2019 | Fu et al. | |
| 2020/0138117 | A1 | 5/2020 | Rosser et al. | |
| 2020/0156826 | A1 | 5/2020 | Kilduff et al. | |
| 2020/0377280 | A1 | 12/2020 | Pace et al. | |
| 2021/0346616 | A1 | 11/2021 | Krietzman | |
| 2021/0401061 | A1 | 12/2021 | Davis et al. | |
| 2023/0232886 | A1 | 7/2023 | Robinson et al. | |

FOREIGN PATENT DOCUMENTS

| | | |
|---|---|---|
| CN | 101606758 | 12/2009 |
| CN | 201379072 | 1/2010 |
| CN | 204393344 | 6/2015 |
| JP | 3164992 | 12/2010 |

* cited by examiner zone A
zone B
zone C
zone N
Zone AA
Zone BB
Zone CC
Zone NN

PORTABLE MULTIZONE INDUCATION VAPORIZER FOR TOBACCO CONSUMABLES

RELATED APPLICATIONS

This application is a continuation of U.S. patent application Ser. No. 17/147,030, filed Jan. 12, 2021, and entitled "PORTABLE TEMPERATURE CONTROLLED AROMATHERAPY VAPORIZERS" which is a continuation in part of U.S. Pat. No. 10,893,707, filed May 13, 2019 entitled "Portable Temperature Controlled Aromatherapy Vaporizers" which is a continuation of U.S. Pat. No. 10,299,515, filed Feb. 18, 2018 entitled "Dynamic Zoned Vaporizer" which is a continuation in part of U.S. Pat. No. 9,894,936, filed Feb. 16, 2016 and entitled "Zoned Vaporizer" U.S. Pat. No. 9,894,936 which claims the benefit of U.S. Provisional Patent Application Ser. No. 62/116,926 entitled CARTRIDGE AND HEATER filed on 17 Feb. 2015; Application Ser. No. 62/127,817 entitled MULTI ZONE VAPORIZER filed on 3 Mar. 2015; Application Ser. No. 62/184,396 entitled VAPORIZER DEVICE AND METHOD 25 Jun. 2015; Application Ser. No. 62/208,786 entitled VAPORIZER CARTRIDGE AND HEATER 23 Aug. 2015; Application Ser. No. 62/270,557 entitled THIN CONVECTION VAPORIZER filed 21 Dec. 2015 the disclosures of each of the above referenced applications are incorporated by reference herein in their entirety as if fully set forth herein.

This application is also continuation of U.S. patent application Ser. No. 17/211,721, filed Mar. 24, 2021, and entitled "VAPORIZERS WITH CARTRIDGES WITH OPEN SIDED CHAMBER" which is a continuation of U.S. Pat. No. 10,986,872, filed Aug. 30, 2018 entitled "VAPORIZER AND VAPORIZER CARTRIDGES" which is a continuation of U.S. Pat. No. 10,076,137, filed Feb. 17, 2016 entitled "VAPORIZER AND VAPORIZER CARTRIDGES" which claims the benefit of U.S. Provisional Patent Application Ser. No. 62/116,926 entitled CARTRIDGE AND HEATER filed on 17 Feb. 2015; Application Ser. No. 62/127,817 entitled MULTI ZONE VAPORIZER filed on 3 Mar. 2015; Application Ser. No. 62/184,396 entitled VAPORIZER DEVICE AND METHOD 25 Jun. 2015; Application Ser. No. 62/208,786 entitled VAPORIZER CARTRIDGE AND HEATER 23 Aug. 2015; Application Ser. No. 62/270,557 entitled THIN CONVECTION VAPORIZER filed 21 Dec. 2015 the disclosures of each of the above referenced applications are incorporated by reference herein in their entirety as if fully set forth herein.

BACKGROUND OF THE DISCLOSURE

Field of the Disclosure

The present disclosure relates generally to smokeless disposable cartridges containing vaporizable oils, compounds and/or other plant-based material which upon appropriate zoned heating controllably releases vapor.

RELATED ART

Vaporizer for plant-based materials and/or essential oils is known. Vaporizers which allow a fluid gas containing the vapor and other residues to follow a fluid pathway from source of vapor to user inhalation exist. *Cannabis*, hemp, tobacco and other botanicals have been known in the art to be vaporized or burned to release organic material in the form of inhalable material. Vaporizing at correct temperatures can boil off the oils for inhalation without combusting the plant material.

Vaporizer for plant-based materials and essential oils and exist. Vaporizers allow aromatherapy or inhalation. Vaporizers which allow inhalation from a fluid pathway whereby gas containing the vapor without combustion by products through a fluid pathway from source of vapor to exists. Herbs and botanicals have been known in the art to be vaporized or burned to release organic material in the form of inhalable material.

Lavender vaporizes at 260° F. Tobacco vaporizes between 257° F. to 392° F. Green tea vaporizes between about 175° C. to 185° C. Valerian vaporizes at about 235° C. Chamomile used to aid in the relief of anxiety vaporizes at about 380° F. Peppermint vaporizes at about 255° F. Peppermint is also known to ease symptoms of allergies and asthma, in addition to alleviating some of the side effects that come along with the common cold or a sinus infection. *Cannabis*, has a range at which it can be heated to release different cannabinoids as vapor without burning the organic material from below 200 F to about 430 F.

*Cannabis* contains over 421 different chemical compounds, including over 60 cannabinoids. Cannabinoid plant chemistry is far more complex than that of pure THC, and different effects may be expected due to the presence of additional cannabinoids and other chemicals. Eighteen different classes of chemicals, including nitrogenous compounds, amino acids, hydrocarbons, carbohydrates, terpenes, and simple and fatty acids, contribute to the known pharmacological properties of *cannabis*.

Heating a cartridge configured to contain organic plant material and/or infused oils on a carrier material may, in some instances, overheat at least portions thereof and therefore combust, overheat or otherwise release unwanted substance which may include carcinogens and chemicals into the vapor.

It is therefore a desideratum to have a device, method and or system wherein such heating is better managed.

DESCRIPTION

A method, system and device is disclosed which can at least one of reduce and eliminate the clogging of a fluid pathway in a vaporizer for inhalation of organic material via an output connected directly to the fluid pathway.

Aspects of aromatherapy vaporizer systems and methods disclosed include using at least two separate heating elements to selectively heat up different portions of a containment end of a cartridge including a case configured to contain a heater, power supply and controller; a controller; a power supply in signal communication with the controller; a heater with at least two separately controlled heating elements each affixed cross-sectionally around a portion of the cartridge guide; wherein each heating element is in signal communication with the controller; at least one temperature sensors in thermal communication with at least one of an outer and an inner wall of the cartridge guide and in signal communication with the controller; a cartridge having an inhalation end and a containment end configured to fit within the cartridge guide and be in thermal communication with the heating elements; a cartridge with a containment end including metal and containing material to vaporize; and, wherein during heating by the controller of a specific activated heating element the containment end is heated. In some instances the metal is foil. In some instances the portion of foil closest to the active heating element heats up more than foil remote from the active heating element. In some instance the controller switches activated heating elements based on at least one of time and temperature. In some instances the containment end is a combination of materials including of paper and foil.

Aspects of aromatherapy vaporizer systems and methods disclosed include using at least two separate heating elements to selectively heat up different portions of a containment end of a cartridge including a case configured to contain a heater, power supply and controller; a controller; a power supply in signal communication with the controller; a heater with at least two separately controlled heating elements each affixed cross-sectionally around a portion of the cartridge guide; wherein each heating element is in signal communication with the controller; at least one temperature sensors in thermal communication with at least one of an outer and an inner wall of the cartridge guide and in signal communication with the controller; wherein the controller receives temperature sensor input and controls the timing and/or the amount of power applied to the activate heating element; placing a cartridge having an inhalation end and a containment end configured to fit within the cartridge guide and be in thermal communication with the heating elements into the cartridge guide. The cartridge having a containment end including metal and containing material to vaporize; and, wherein during heating by the controller of a specific activated heating element the containment end is heated. In some instances the metal is foil. In some instances the portion of foil closest to the active heating element heats up more than foil remote from the active heating element.

In some instances the heating is one of inductive and conduction. In some instances vaporizer of controller controls operations of one or more of on/off, sequence of heating, temperature, indicator display of the heater, battery charging, battery and state of charge. By sequentially heating a zone, power consumption to heat one zone is less than the power needed to heat both zones at once. Sequential heating of cross sectional zones reduces over heating of the containment end of a cartridge if subject to same time heating of all portions of the containment zone.

Aspects of methods of heating the containment end of a cartridge include using at least two separate heating elements to selectively heat up different portions of a containment end of a cartridge including placing the metal containment end of the containment end of a cartridge filled with material into a cartridge guide. Wrapped cross sectionally around the cartridge guide are at least two heating elements each separately controlled by a controller configured to control the power supplied to each heating element and the cartridge guide is configured whereby the inhalation end of the cartridge is left outside of the cartridge guide after insertion. By supplying power to the heating elements with the controller the material is heated. To remove vapor a subject inhaled on the inhalation end to move vapor through the cartridge. In some instances the controller receives temperature sensor input and controls the timing and/or the amount of power applied to the activate heating element. In some instances the metal is foil. In some instances the foil is heated by induction. In some instances the portion of foil closest to the active heating element heats up more than foil remote from the active heating element. In some instances the controller switches activated heating elements based on at least one of time and temperature. The material is one of tobacco and hemp.

Aspects of vaporizer methods include using at least two separate heating elements to selectively heat up different portions of a common receivor; selectively controlling the heating elements by a controller; and, wherein at least one of the temperature and the time of heating is controlled by the controller. The methods may further include connecting at least one temperature sensor to the controller and wherein the controller in response to temperature sensor measurements adjusts the amount and/or timing of electricity provided to a turned-on heating. In some instance the method includes communicating via illumination if the temperature of at least a portion of the common receivor is at a predetermined temperature.

A controller utilizing one or more temperature sensors maintains the receivor exposure temperatures (SET). SET is selected from the group consisting of about 180 degrees F., about 200 degrees F., about 220 degrees F., about 240 degrees F., about 260 degrees F., about 280 degrees F., about 300 degrees F., about 320 degrees F., about 340 degrees F., about 360 degrees F. about 380 degrees F., 390 degrees F., 400 degrees F., 410 degrees F., 420 degrees F., 430 degrees F., and 440 degrees F.

FIGURES

The invention may be better understood by referring to the following figures. The components in the figures are not necessarily to scale, emphasis instead being placed upon illustrating the principles of the invention. In the figures, like reference numerals designate corresponding parts throughout the different views.

Figures 1, 2, 3, 4:
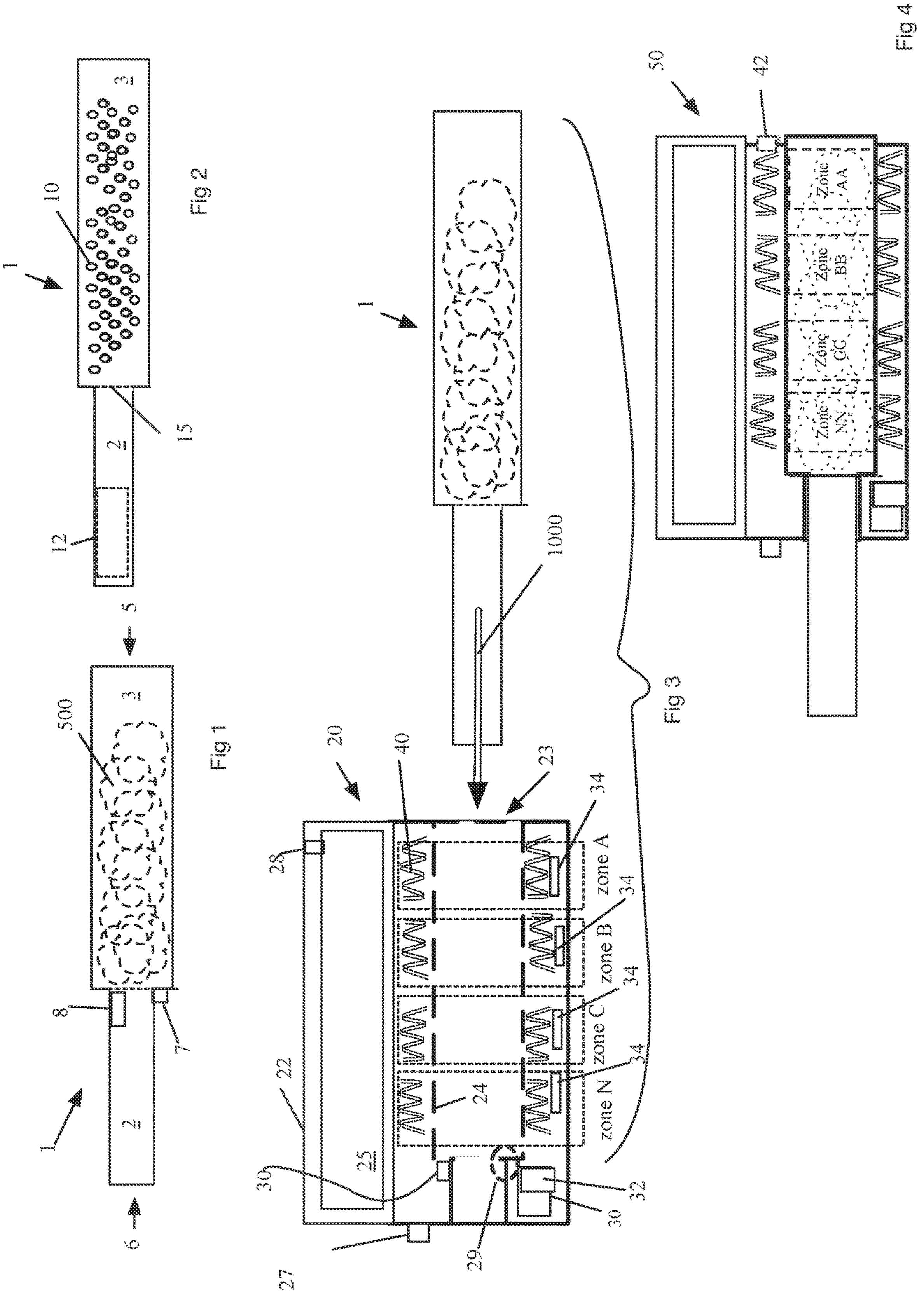
FIGS. 1-4 illustrate aspects of cartridge modules and associated heater.

All descriptions and callouts in the Figures and all content therein are hereby incorporated by this reference as if fully set forth herein.

FURTHER DESCRIPTION

A modular vaporizer which eliminates one or more of fouling, mess, resin build up, debris build-up and performance reducing impact of same is disclosed herein.

Vaporizing plant material for inhalation of plant borne chemicals is considered by some to be less harmful then combusting the plant material. Tobacco and *cannabis* are examples of such material.

Traditional vaporizers provide a flow pathway from heating unit to fluid inhalation path way through material with essential oils or compounds to user. Those pathways and the heating receivor become covered with resins from plant oils.

The instant disclosure teaches an inhalation cartridge (plant material filled consumable) and a heater base wherein the cartridge contains the organic material to be vaporized.

The material is contained to prevent direct contact with the heater or a heater in a receivor. In some instance the fluid pathway from the organic material to the inhalation point is integral to the cartridge and disposable thereby eliminating clogging, charring, resin, oil, material or other build up in the fluid pathway.

It is appreciated by those skilled in the art that some of the circuits, components, controllers, modules, and/or devices of the system disclosed in the present application are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical such as, for example, conductive wires, electromagnetic wave guides, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying analog and/or digital formats without passing through a direct electromagnetic connection. These information paths may also include analog-to-digital conversions ("ADC"), digital-to-analog ("DAC") conversions, data transformations such as, for example, fast Fourier transforms ("FFTs*), time-to-frequency conversations, frequency-to-time conversions, database mapping, signal processing steps, coding, modulations, demodulations, etc. The controller devices and smart devices disclosed herein operate with memory and processors whereby code is executed during processes to transform data, the computing devices run on a processor (such as, for example, controller or other processor that is not shown) which may include a central processing unit ("CPU"), digital signal processor ("DSP"), application specific integrated circuit ("ASIC"), field programmable gate array ("FPGA"), microprocessor, etc. Alternatively, portions DCA devices may also be or include hardware devices such as logic circuitry, a CPU, a DSP, ASIC, FPGA, etc. and may include hardware and software capable of receiving and sending information.

Heating logic turns on/off heating elements forming zones to heat different sections of the cartridge at different times. In some instances the cartridge has limited orientations of insertion to hold it fixed in the heater and unable to rotate about its axis. In some instances the cartridge is marked with a frangible identifier which is broken on insertion to prevent reuse of a spent cartridge. In some instances the cartridge is marked with an identifier that is stored in memory to turn off the heater if the cartridge has already been used.

FIGS. 1, 2, 3 and 4 show elongated cartridge 1 with two ends, the first end 2 is an inhalation (or intake) end or portion and the second end 3 is a containment (or heating) end or portion. During use air pass into the open front 5 to the containment end 3 and then into the inhalation end 2 and finally out through the open back 6. Optionally, a frangible section 7 may be formed on the cartridge whereby it will be deformed on use with a heater and render the cartridge finished an unable to be reused. In some instance an ID 8 which verifies cartridges non-used status may be added to the cartridge. In some instances small perforations 10 may be formed in the containment end 3 to effectuate better heat flow from heating elements. In some instances a filter or flavor filter 12 is placed in the inhalation end 2 whereby vapor inhaled passes. The filter can remove some materials from the vapor and the flavor filter adds an inhalable flavor to the vapor. A flow through divider 15 such as a screen or coarse filter which allows vapors to pass through may be positioned in the cartridge between the containment and inhalation ends. Organic matter 500 is placed in the containment 3 for use of the cartridge. The organic material is a material containing oils or resins (such as, hemp, tobacco and *cannabis*) which can be released via heating.

The cartridge is formed of an inexpensive disposable material which will not burn or release toxic or harmful fumes at temperatures that are reached by the heater in the device. In generally for many organic materials the temperature of vaporization will be between 320 F to 420 F. The cartridge may be scarred by the heating process as it is disposable. Paper, fibers such as cotton and hemp, metal, foil, plastic, resins, thermoplastics, ceramics, ceramic doped paper, glass, PEEK, and combination thereof may be suitable material for some or all of the cartridge. The cartridge maybe made of different materials for different regions. For example the containment portion 3 is subjected to the greatest heat. The material or materials therein must be suitable to transfer a sufficient portion of the heat applied to its surface through its wall and into the containment portion to thereby cause vapor of the organic material 500 without burning. In some instances the interior annular wall of the containment portion has one or more conductive regions facing the inside.

During use the cartridge 1 is inserted in a heater 20 via the pathway of arrow 1000. This also may be referred to as a pass-through cartridge device. The example of the passing the cartridge through the heater is not a limitation and those of ordinary skill in the art will recognize that a non-pass-through configuration is within the scope of this disclosure. The heater 20 has a case 22 with an interface forming a receivor 23 (forming a guide or interface within the heater for the cartridge). The interface 23 opens into a cartridge guide 24. The guide is a channel within the case that is open to allow passage of the cartridge therein. The guide refers to a region within the case that is roughly the cross-sectional circumference or perimeter around the cartridge. Accordingly, if heating elements are placed in the area of the cartridge guide, they would be adjacent to at least a portion of the cartridge. Within the case is a battery 25. A cartridge identification reader 26 may also be added to the case. The identification reader is a sensor that verifies a cartridge is new and has not been previously used. It may determine that a heat indicator has previously been heated, it may determine that a code which is ablated by the heat of use his or is not present thereby interrupting or allowing heating. It may read a code and verify that the code has not been used during a prescribed interval. An on/off switch 27 is shown, and battery may have a charging I/O 28. The case may have a mechanical or electrical mechanical actuator 29 that is activated by a cartridges frangible section 7 and also deforms, or breaks said frangible section upon actuation. Actuation is the communication of the actuator 29 to the controller whereby the controller recognizes the cartridge as "new" and not used and thereby allows electrical current to flow to the heating elements. Within the case is a controller 30. The controller is a microprocessor which may have memory 32 and which controls certain operations of the vaporizer device. Operations may include one or more of time, date, location, security code, on/off, sequence of heating, temperature, indicator display of the heater, battery charging, battery management, battery state of charge indication, cartridge verification. Those of ordinary skill in the art will recognize that blue tooth or other wireless or wired connection to a smart phone or computer may also be used to perform some of the controller functions and that would be within the scope of this disclosure. One or more temperature sensors 34 are within the case and near the receivor 23.

The case 22 contains one or more heating elements 40. One or more heater vents 42 may be provided. Although four heating elements are shown those of ordinary skill in the art will understand that what is disclosed is one or more zones. In some instance only a single heating zone may be provided, in other instances multiple zones may be utilized and such is within the scope of this disclosure.

In some exemplary implementations a multi-zone heater is disclosed it may have heat zone "A" to zone "N". A cartridge, during use, will have corresponding zones "AA"" to "NN" which align generally with the heat zones.

During use one or more zones may be turned on to supply heat, via heating elements, to heat organic material 500 and release vapor. Sequencing the zones for heating is advantageous in that it can reduce power consumption by splitting up the total area to heat into the zones so that less power per zone is needed then power to heat all zones at the same time. Sequencing the zones for heating is also advantageous in that it can release vapor from a discreet amount of organic material at one time thereby leaving less heated or unheated areas of organic material with the same cartridge for a next use. Sequential heating also reduces overheating and supports continuous use while reducing overheating. Overheating, for at least *cannabis* results in singeing the material which is commonly referred to as a "popcorn" taste.

Figure 5B:
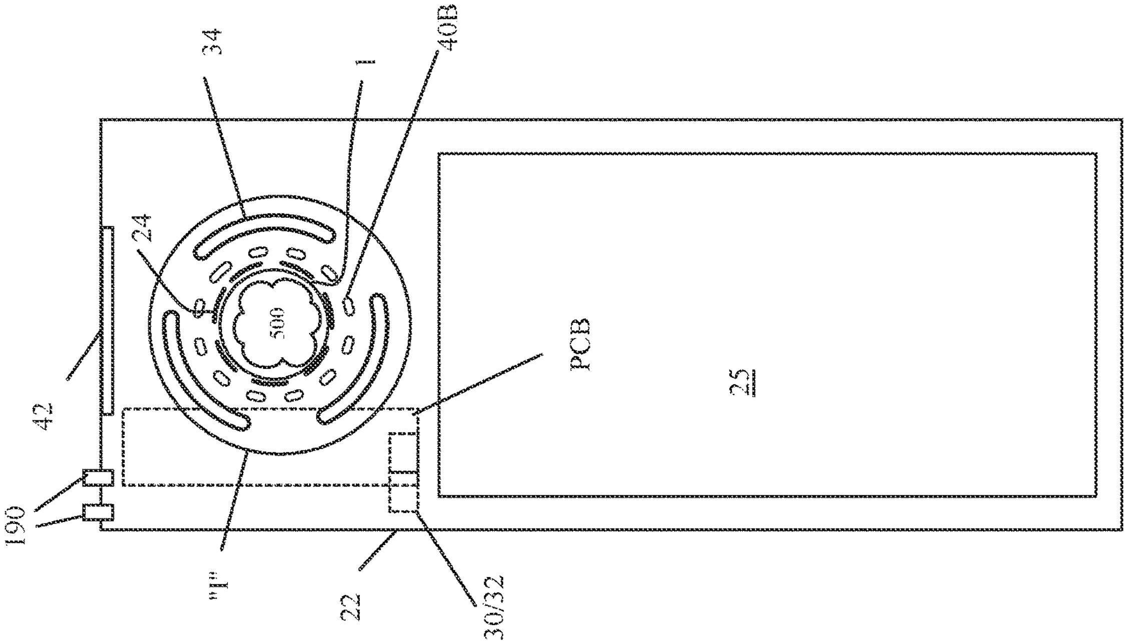
FIGS. 5A& 5B illustrate aspects of cartridge modules and associated heater with multi-zone heating configuration.
Figure 5A:
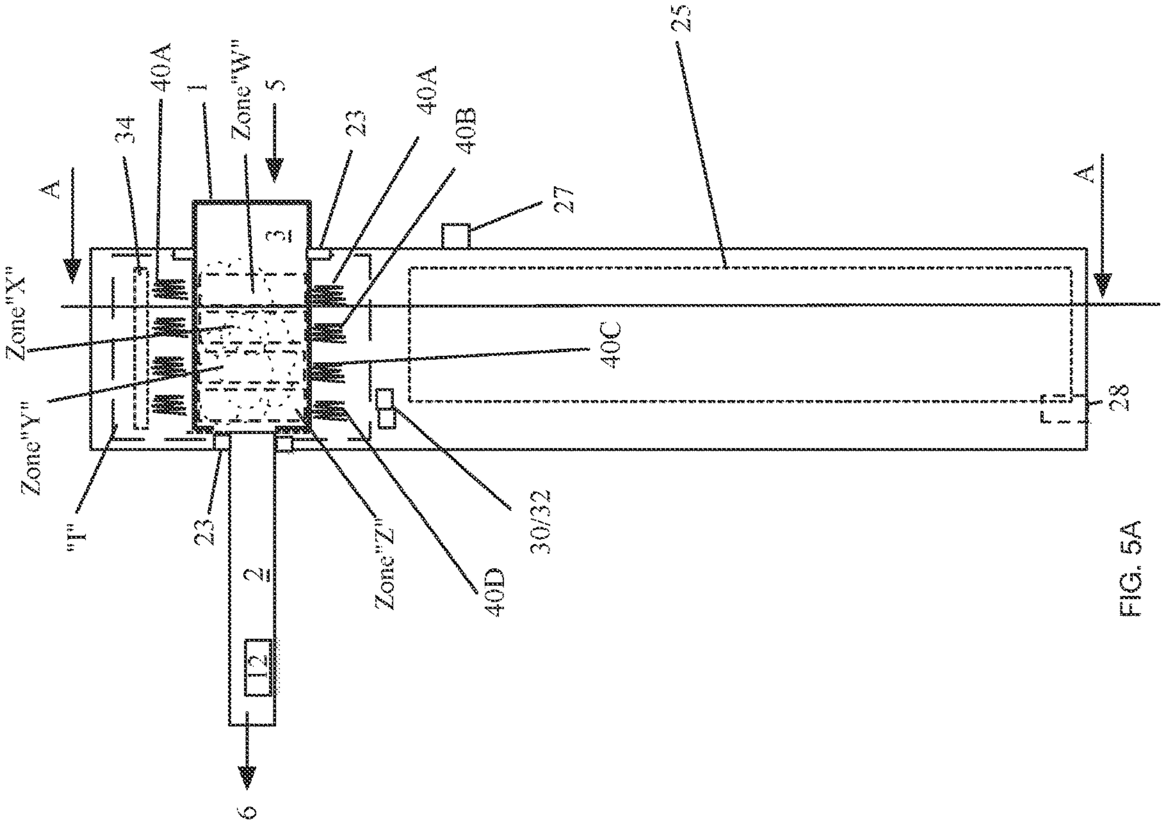

FIGS. 5A-5B show an alternative package for the systems shown in FIGS. 1-4. This disclosure heats the cartridge 1 akin to slicing a sausage. Each of zones "W"-"Z" are sequentially heated. The controller keeps count of which was the last zone to be heated. The controller keeps count of when all zones have been heated and can stop the heat cycle until a spent cartridge is removed and replaced with a new cartridge. It also adds indicators 190. Indicators are shown as LED lights. Indicators are used to communicate status of the device to a user. The communication may be of a spent cartridge, a spent zone that has been heated, the remaining zones to heat, a need for recharge, or remaining zones to heat. Heating elements 40A-4D are in thermal contact with heat zones "W"-"Z". One or more temperature sensors 34 are within the case and near the receivor 23, each temperature sensor is associate with at least one of a heat zone and heating element. Insulation "I" may be placed around the heater elements inside the case 22. The heater elements may optionally be connected to a PCB board via conductive wires and the controller and memory may also be on that board. The battery 25 is connected via the on/off switch 27 to the controller 30 to supply power to the heat elements. The controller 30 may be connected to separate digital memory 32. The controller initiates each heater element (40A-40D) sequentially to spend each zone and then use the next. When the sequence is complete the device stops heating until reset. All aspects of systems to verify, authenticate and assure that a used cartridge is not reloaded into the device, as described herein with respect to other exemplars are hereby incorporated into this description with respect to FIGS. 5A and 5B.

The cartridge mates with the receivor 23 which places it adjacent to heating elements. The cartridge heating portion (containment) should be constructed so that it does not burn, or combust at exposure temperatures below at least one of 400 degrees F., 410 degrees F., 420 degrees F., 430 degrees F., and 440 degrees F. The failure to burn or combust occurring after at least one of 30 seconds exposure, 1 minute exposure, 2 minute exposure. The failure to burn or combust occurring after at three least 30 second exposures. The failure to burn or combust occurring after at three least 1 minute exposures. The failure to burn or combust occurring after at least four 1 minute's exposures. The failure to burn or combust occurring after at five least 1 minute exposures. The failure to burn or combust occurring after at seven least 1 minute exposures. The failure to burn or combust occurring after at eight least 1 minute exposures.

Figure 6A:
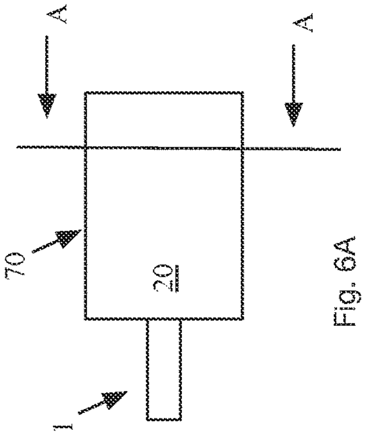
FIGS. 6A-6D illustrate aspects of a cartridge module and vertical heaters.
Figure 6B:
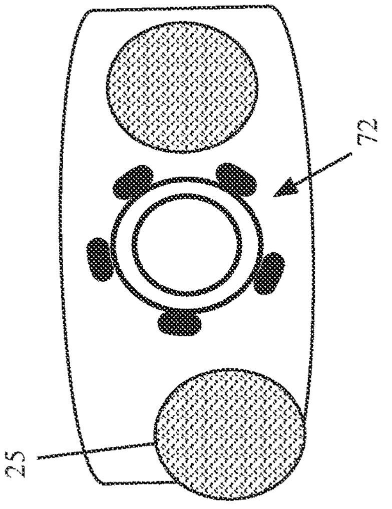
Figure 6C:
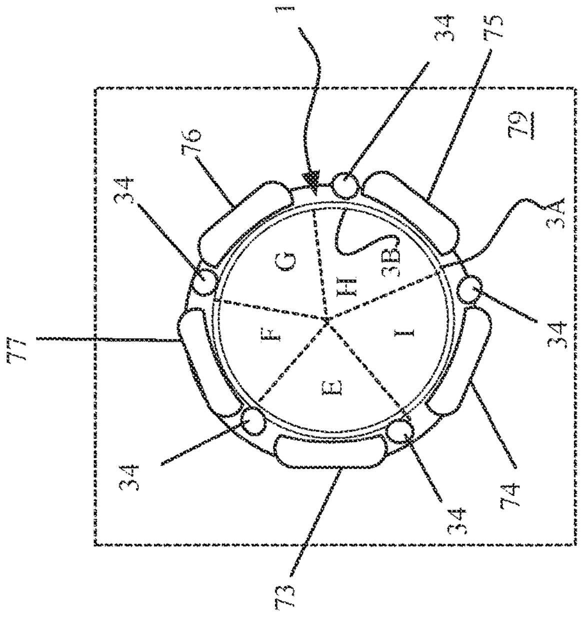

FIGS. 6A-6D shows aspects of another exemplary implementation of the cartridge and heater device. A heater 70 receives a disposable cartridge 1. FIG. 6A is FIGS. 6B and 6C which show view cut away view and a close up view along the line "A-A" of FIG. 6A showing vertical heating zone 72 with the common receivor. The common receivor means a single linear receptacle which may have a partially sealed first end and has an at least partially open second end. FIG. 6C is a view of the aspects of the vertical zone heater 72 within the common receivor showing individual heating elements and temperature sensors 34 associated with heating element aligned with the cartridge 1, each individual element is configured co-axially along the length of the cartridge adjacent to the material, each heating element 73-77 forms a corresponding vertical heat zone "E"-"I" an each heat zone is adjacent to a portion of the cross section of the outer wall 3A of the containment 3 portion of said cartridge along a pre-determined axially length.

Figure 6D:
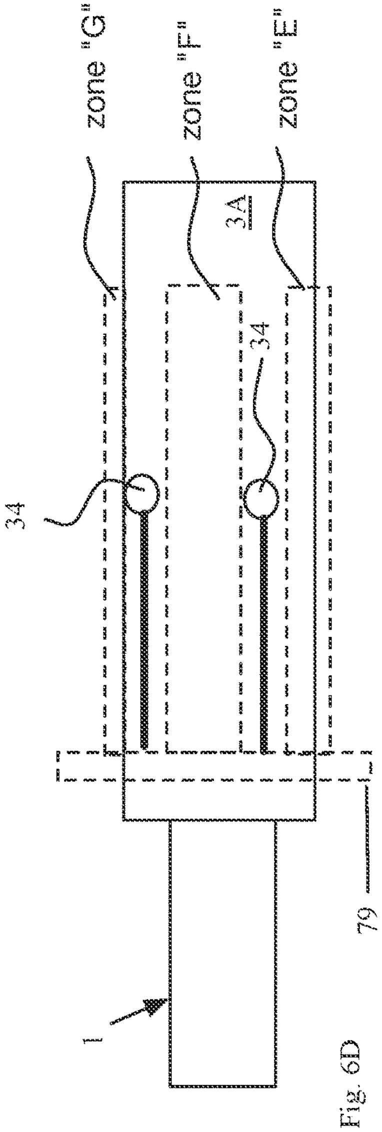

The controller initiates each heating element sequentially to activate selected zone(s) and then the next. When the sequence is complete the device stops heating until reset. Accordingly, vertical heat zone "E" is primarily heated by vertical zone heater element 73 and so on. A printed circuit board (PCB) or other support 79 may be used to support the heater elements 73-77 FIG. 6D shows a side view of a cartridge 1 with a representation of vertical heat zones E-G. Temperature sensors are between the heating elements against the outer wall. Temperature sensors are in signal communication with the controller and during use the input from one or more temperature sensors is used to adjust the heating time, the pulse width modulation" (PWM) protocol applied to one or more heating elements to maintain a target temperature.

Figure 7A:
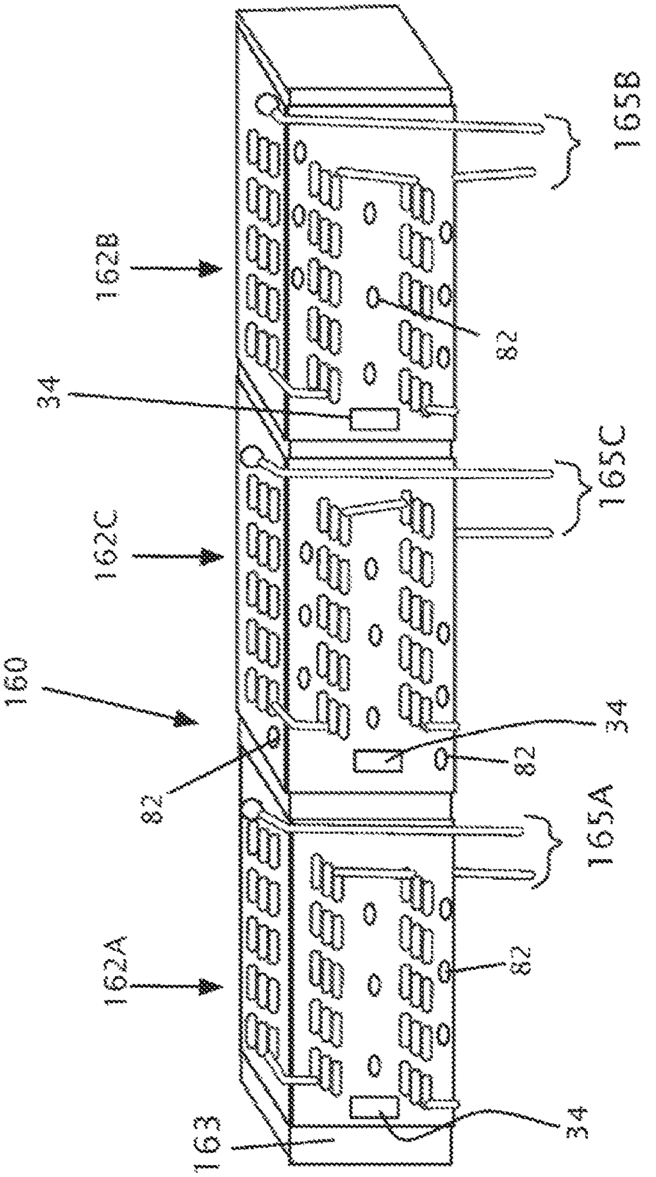
FIGS. 7A & 7B illustrate zoned heating and elements associated therewith.
Figure 7B:
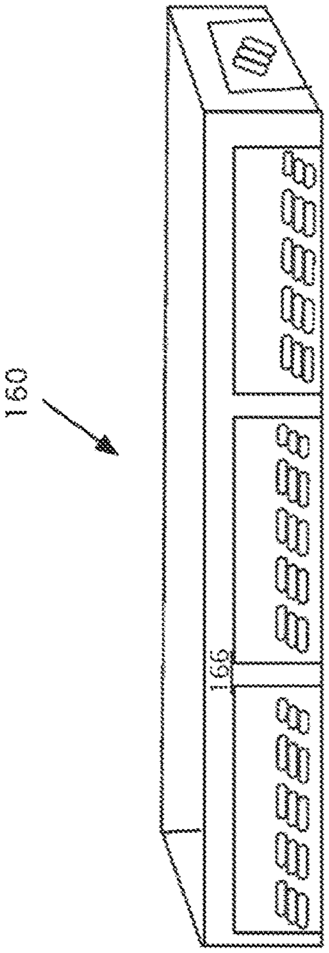

FIGS. 7A-7B is another exemplary of zoned heating with conduction or induction heating of the chamber 160 which receives material. FIGS. 7A-6C illustrate variations on a zoned heating chamber using induction or conduction heater elements in close proximity to the exterior annular wall of the heating chamber. Chamber 160 which is generally elongated, although shown as rectangular those of ordinary skill in the art will recognize that adding a radius to the corners and a draft angle or slope to the walls is within the scope of the disclosure. Air flow into the chamber is through intake vents 82. The zoned heating utilizes separate heating elements 162A-C. The elements are in thermal contact with the annular wall 163 of the chamber. Each heating element has electrical contacts 165A-C which are connected to the controller (not shown) whereby the zone that is being heated is controlled. A heated zone with a heating element receiving electrical power may be referred to as active because it is receiving power and therefore turned on. Temperature sensors 34 such as thermistors and thermocouples are placed near each zone heater and are electrically connected to the controller (not shown).

The heating elements 162A-C may wrap around the sides 166 of the annular wall. The measurement of heat derived from the temperature sensor data is used by the controller to adjust the electricity provided to an active heating element to target a predefined temperature or range of temperatures.

Figure 8A:
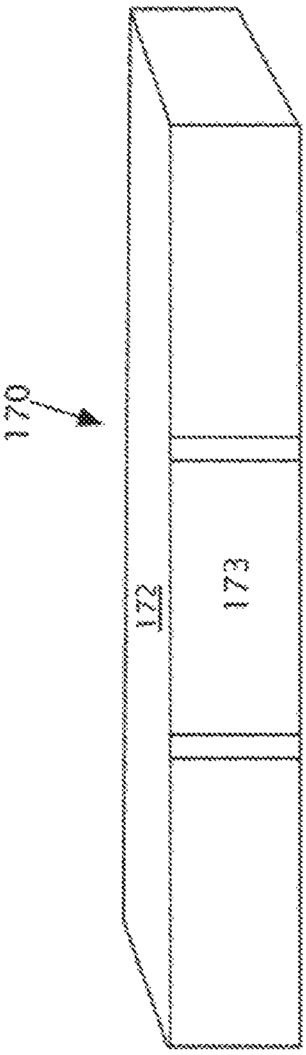
FIGS. 8A-8D illustrate a zoned heating chamber and elements associated therewith.

In FIG. 8A the chamber 170 is generally elongated, although shown as rectangular those of ordinary skill in the art will recognize that adding a radius to the corners and a draft angle or slope to the walls is within the scope of the disclosure. The chamber may be constructed of metal, ceramic, high temperature plastic, it may be metallized plastic formed of glass such as quartz glass or borosilicate. A shaped chamber may have thickened sections which form part of the insulator dividers 35 (which are optional).

Figure 8B:
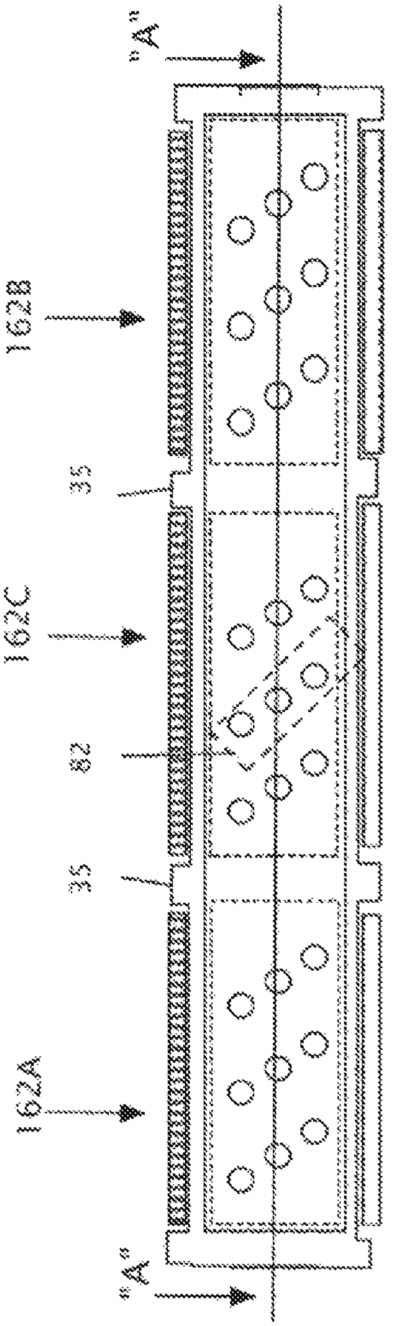
Figure 8C:
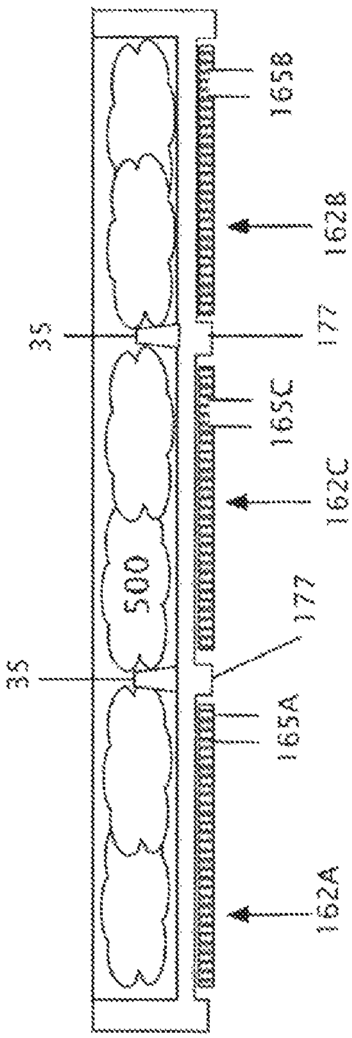
Figure 8D:
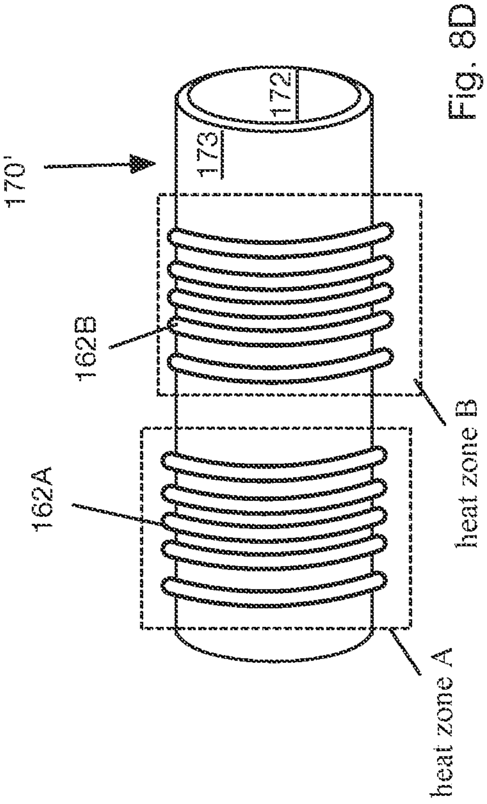

FIG. 8A is a bottom perspective view of the chamber, FIG. 8B is bottom view of the chamber. FIG. 8C is a cut-away view along the line of "A"-"A" of FIG. 8B. Air flows into the chamber 170 through intake vents 82. The zoned heating utilizes separate heating elements 162A-C. The elements are in thermal contact with the inner annular wall 172 of the chamber. Each heating element has electrical contacts 165A-C which are connected to the controller (not shown) whereby the zone that is being heated is turned on and off and the temperature thereby is adjusted. Temperature sensors 34 such as thermistors and thermocouples are placed near each zone heater and are electrically connected to the controller (not shown). The heating elements 162A-C may wrap around the outer side wall 173 of the annular wall. Extended heat sinks or cooling fins 177 may be formed as part of the chamber or affixed thereto to assist with heat management in the chamber and zones. FIG. 8D shows chamber 170' in a tubular form having an inner annular wall 172 and two heating elements 162A and 162B around separate cross-sections of the outer side wall 173 of the chamber.

FIGS. 9A-9D show a non-pass through cartridge heating system, device and method. A case 200 contains heating elements 40A and 40B. Each heating element forms a Heat Zone (zone A and zone B). Each heat zone has a corresponding zone (Zone AA and Zone BB) within the cartridge containment foil or metal layer 3B near the heating element. Upon heating via a selected heating element the chamber (see FIG. 8A-8D) configured as a cartridge guide 24 heats up and the corresponding zone heats up in the cartridge. The disposable cartridge 1 is constructed of materials including paper, fiber such as cotton and hemp, metal, foil, plastic, resins, thermoplastics, ceramics, ceramic doped paper, glass, PEEK. The cartridge maybe made of different materials for different regions, and the cartridge is removable from the case 200. An interface 23 opens into the cartridge guide 24 which is also within the case. The cartridge fits through interface 23 whereby the containment end 3 (which is also referred to as distal end) of the cartridge is removably placed into the cartridge guide 24 and the inhalation end 2 (also referred to as the proximal end) is extended from the case. The guide is a channel within the case that is open to allow passage of the cartridge therein. The guide refers to a region within the case that is roughly the cross-sectional circumference or perimeter around the cartridge. Accordingly, if heating elements are placed in the area of the cartridge guide, they would be adjacent to at least a portion of the cartridge. An additional seal 210 may be within the case to seal against the cartridge to limit any air leakage. An organic material 500 for vaporization is within the distal end near the one or more heater elements 40. The containment end 3 is subjected to the greatest heat. The material or materials of the containment end must be suitable to transfer a sufficient portion of the heat applied to its surface through its wall and into the containment end of the cartridge to thereby cause vapor of the organic material 500 without burning.

Sequencing the heat zones (zone A and zone B) for heating is advantageous in that it can reduce power consumption by splitting up the total area to heat into zones (Zone AA and Zone BB) and when heating them sequentially less power is required for heating one zone then to heat all zones at the same time. Sequencing the zones for heating is also advantageous in that it can release vapor from a discreet amount of organic material at one time thereby leaving less heated or unheated areas of organic material with the same cartridge for a next use. Sequential heating also reduces overheating and supports a continuous inhalation by reducing the overheating which would occur if all heating elements were turned on at the same time.

Figure 9D:
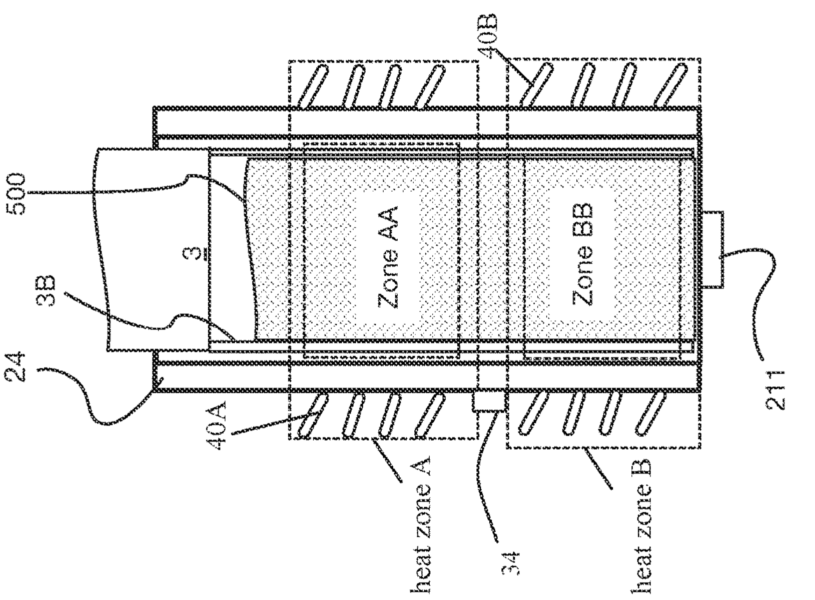
FIG. 9D illustrates the cartridge guide and zone heaters of FIG. 9A.
Figure 9A:
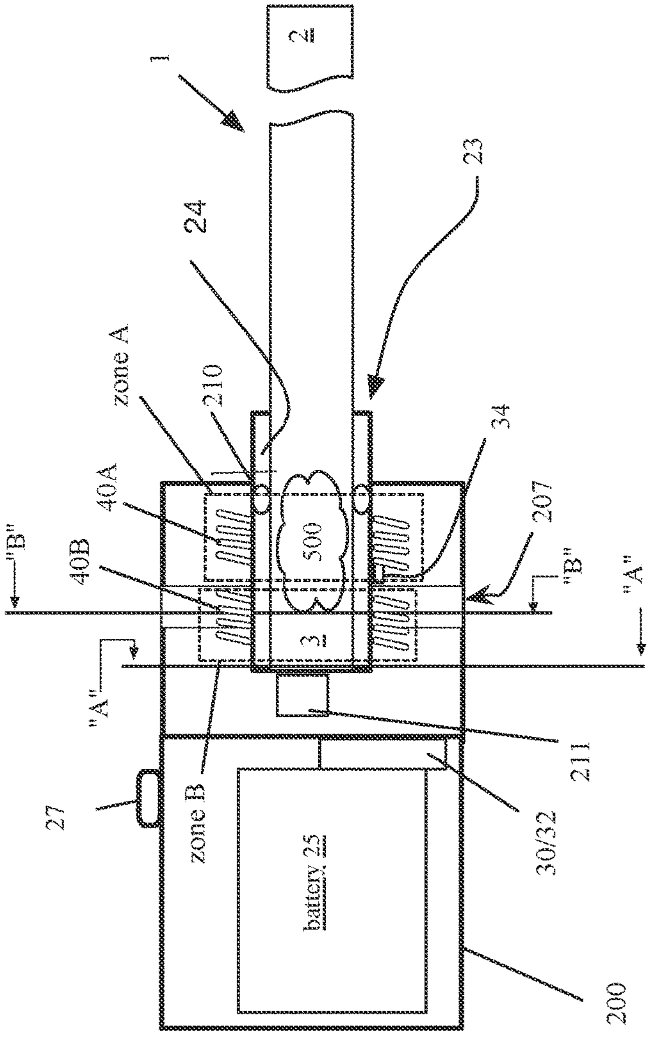
FIGS. 9A-9C illustrate aspects of another cartridge module and heater.
Figure 9C:
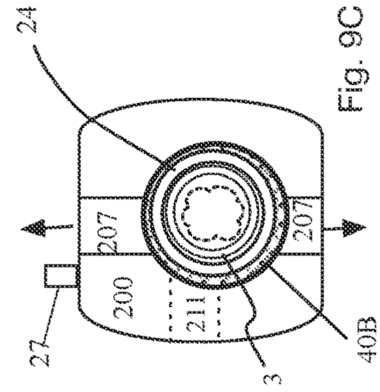
Figure 9B:
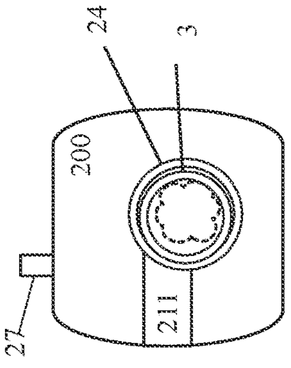

One or more vents 207 allow the heater to vent from the case. At least one air intake 211 provides a fluid pathway for air to enter the case and be drawn through the cartridge from distal end to proximal end and then out for inhalation. FIG. 9B shows a cut away view of the device along the lone of A-A and FIG. 9C shows a cut-away of the device along the lines of "B-B". FIG. 9D shows a component view of a containment end 3 within a cartridge guide 24 and two heaters 40A and 40B for multizone heating. The cartridge is disposable and constructed of materials including paper, fiber such as cotton and hemp, metal, foil, plastic, resins, thermoplastics, ceramics, ceramic doped paper, glass, PEEK. The cartridge maybe made of different materials for different regions. In FIG. 9D within the cartridge a foil or metal layer 3B is shown nearest the containment end 3. As described above because the containment end 3 is subjected to the greatest heat the material or materials it is formed of must be suitable to transfer heat into the containment end to thereby cause vapor of the organic material 500 therein without burning.

Methods disclosed include a controller that manages heating of a zone at a selected exposure temperatures (SET) to vaporize a portion of the material in the containment area in the accordance with one of variable, preselected and fixed times. The heating of all heating elements may also be referred to as a cycle or a heating cycle. When a cycle is over the cycle has timed out. Temperature sensors are utilized to measure when the chamber or subzone has reached a target temperature. If the amount of time a specific heating element is to be heated is reached the heating of that element has timed out. The controller can track, monitor, measure or otherwise count that heating time. In other instances the controller may switch between subzones, preferably using a PWM protocol to supply power to each heating element separately to maintain a temperature at a predetermined range. Selective heating allows the "off" zone to cool while the "on" zone is heating. Said cooling is effective to reduce overheating and/or singeing of material.

In some instances the controller prohibits heating when a zone has already been heated for a predetermined timeframe. In some instances the controller may accept a user over ride to allow reheating of a zone or to heat multiple zones simultaneously.

Figure 10:
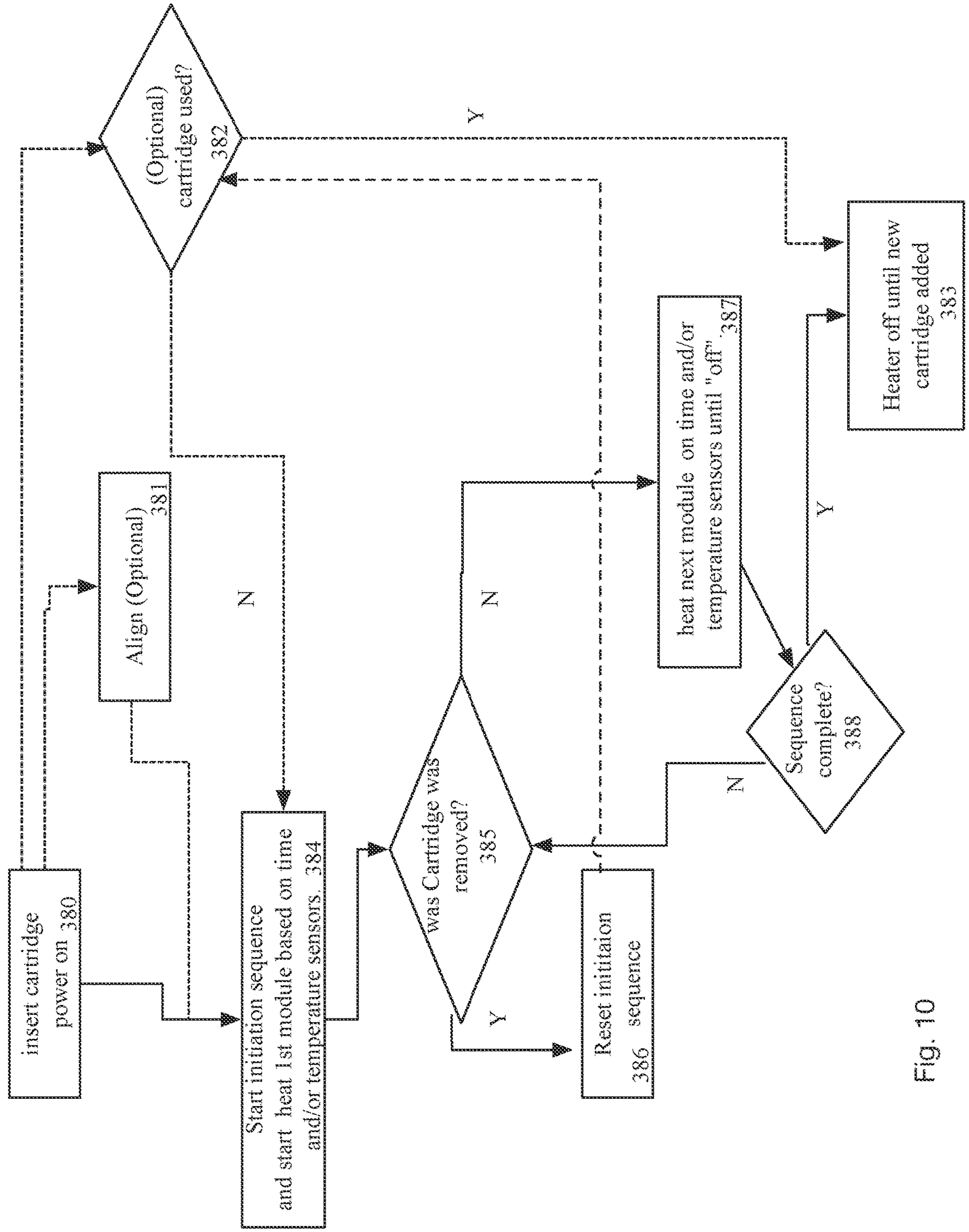
FIG. 10 illustrates a process for heating a multi-zone system.

FIG. 10 illustrates aspects of a control sequence and sequence of operation of one or more exemplary implementations disclosed herein. First a cartridge is inserted into a heater unit and the on/off switch is depressed 380. Optionally, a mechanical, optical, or electro-mechanical fixture limits the orientation of the cartridge to a predefined one 381. Optionally, a sensor collects data on the cartridge to determine if it is used 382. If used 383 keep heater off until a new cartridge is added. If cartridge is not used then start power initiation and heat $1^{st}$ heating element/module 384 based on at least one of time and/or temperature, until user selects "off" or controller shuts off which may be due to time being completed. Then determine if cartridge has been removed 385. If the cartridge has been removed 386 then rest sequence of operation. If not removed 387 heat next heating element/module until user or controller shuts off. Next determine if sequence of heating is complete 388. If no heat cartridge if it has not been removed 385, else reset 386. If cartridge heating sequence is complete (all heating zones have been heated) then keep heater off until a new cartridge is provided 383.

Figure 11:
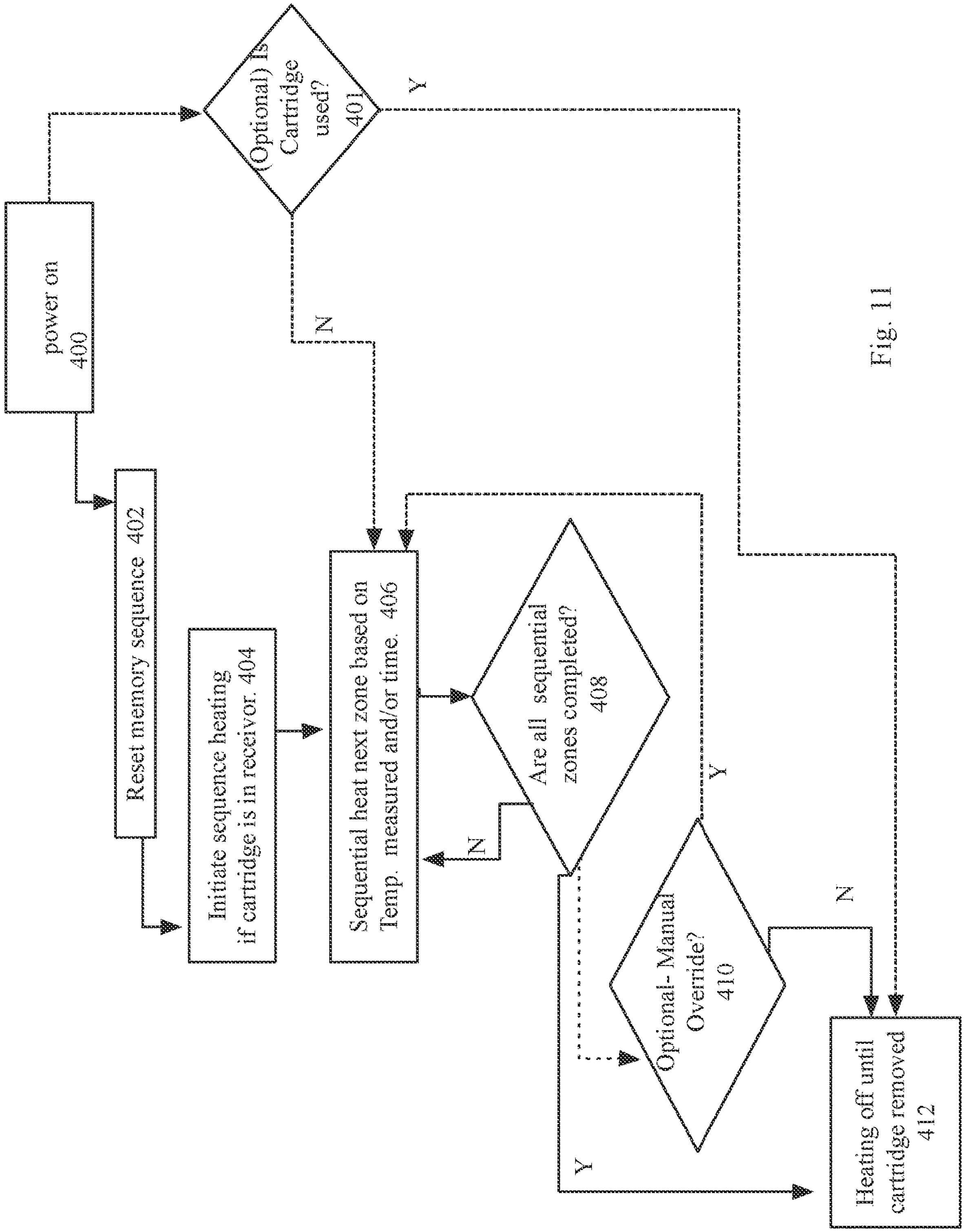
FIG. 11 illustrates a process for heating a removable cartridge system.

FIG. 11 illustrates aspects of a control sequence and sequence of operation of one or more exemplary implementations disclosed herein. First power is turned on 400. Optionally the system checks if cartridge in receivor is used 401. If used turn heater off until used cartridge is removed 412. After power on the controller resets memory sequence for sequentially heating back to beginning 402. Next the controller initiates sequential heating of zones if a cartridge is in the receivor 404. The controller, which is configured to control sequential heating, controls the application of power to the selected "on" heating elements until changing to the next heating element in the selected sequence 406, based on at least one of temperature during heating of the zone and time. The controller decides if sequential heating is complete 408. If "no" the controller continues the system's sequential heating 406. If "yes", optionally the controller checks if manual override 410 is selected which continues the sequential heating loop. Otherwise, the controller stops heating any elements until the cartridge is removed 412.

It will be understood that various aspects or details of the disclosures may be changed combined, or removed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A vaporizer zoned heating system comprising:
- a case configured to contain heating elements, power supply and controller;
- a controller;
- a power supply in signal communication with the controller;
- two separately controlled heating elements each affixed cross-sectionally around a portion of a chamber configured as a cartridge guide;
- wherein each heating element is in signal communication with the controller;
- at least one temperature sensors in thermal communication with at least one of an outer and an inner wall of the cartridge guide and in signal communication with the controller;
- a cartridge having an inhalation end and a containment end configured to fit within the cartridge guide and be in thermal communication with the heating elements;
- the containment end including a metal layer and configured to hold material; and,
- wherein the controller is configured to initiate heating when said cartridge is inserted into the receivor.

2. The vaporizer system of claim 1, wherein the containment end is a combination of materials including at least paper and foil.

3. The vaporizer system of claim 1, wherein the heating of the containment end is by conduction.

4. The vaporizer system of claim 1, wherein the heating of the containment end is by induction.

5. The vaporizer system of claim 1, wherein the material is tobacco.

6. The vaporizer system of claim 1, wherein the metal is a foil.

7. The vaporizer system of claim 6, further comprising the portion of foil closest to the active heating element heats up more than foil remote from the active heating element.

8. The vaporizer system of claim 1, wherein the controller receives temperature sensor input and controls the timing and/or the amount of power applied to the activate heating element.

9. The vaporizer system of claim 8, wherein the controller sequentially switches activated heating elements based on at least one of time and temperature.

10. The vaporizer system of claim 9, wherein power consumption to heat one zone is less than the power needed to heat both zones at once.

11. A method of heating a containment end of a cartridge, the method including:
- forming an elongated cartridge with an inhalation end and a containment end;
- placing metal layer around the containment end of the cartridge;
- placing tobacco to vaporize within the containment end;
- wrapping an outer annular wall of a cartridge guide cross sectionally with two separated and separately controlled heating elements;
- connecting the heating elements to a controller configured to control the power supplied to each heating element;
- inserting the containment end of the cartridge into an interface having a seal and which opens into the cartridge guide;
- wherein the cartridge guide is configured to leave the inhalation end outside of the interface;
- if the controller determines a cartridge is in the receivor then the controller initiates sequential heating of zones via supplying power to the heating elements;
- the controller heats at least one of the cartridge guide and the metal around the containment end.

12. The method of claim 11, the method further comprising the controller receives temperature sensor input and controls the sequence of activating heating elements and the amount of power applied to each heating element.

13. The method of claim 11, wherein the metal is foil.

14. The method of claim 13, wherein the portion of foil closest to the active heating element heats up more than foil remote from the active heating element.

15. The method of claim 12, wherein the controller sequentially activates one heating zone at a time based on at least one of time and temperature.

16. The method system of claim 15, wherein sequential heating of zones reduces overheating of the containment end.

17. The method of claim 13, wherein the heating of the containment end is by induction.

* * * * *